(12) United States Patent
Wagener et al.

(10) Patent No.: US 12,301,409 B2
(45) Date of Patent: May 13, 2025

(54) FIELD DEVICE CONFIGURATION TOOL

(71) Applicant: ABB Schweiz AG, Baden (CH)

(72) Inventors: Dirk Wagener, Stadthagen (DE); Christoph Welte, Neu-Ulm (DE); Christian Fahrenholz, Memmingen (DE); Marcus Heege, Kaisersesch (DE)

(73) Assignee: ABB Schweiz AG, Baden (CH)

( * ) Notice: Subject to any disclaimer, the term of this patent is extended or adjusted under 35 U.S.C. 154(b) by 6 days.

(21) Appl. No.: 17/353,847

(22) Filed: Jun. 22, 2021

(65) Prior Publication Data

US 2021/0406037 A1  Dec. 30, 2021

(30) Foreign Application Priority Data

Jun. 24, 2020 (EP) .................................. 20 181 837

(51) Int. Cl.
*H04L 41/08* (2022.01)
*G06F 3/0481* (2022.01)
*G06F 3/0484* (2022.01)

(52) U.S. Cl.
CPC ............ *H04L 41/08* (2013.01); *G06F 3/0481* (2013.01); *G06F 3/0484* (2013.01)

(58) Field of Classification Search
CPC ..... H04L 41/08; H04L 67/125; H04L 67/303; H04L 67/34; G06F 3/0481; G06F 3/0484; G05B 2219/25428; G05B 2219/2542; G05B 19/0426; G05B 2219/31121
See application file for complete search history.

(56) References Cited

U.S. PATENT DOCUMENTS

| | | | | |
|---|---|---|---|---|
| 2007/0250180 | A1* | 10/2007 | Bump | G05B 19/41845 700/1 |
| 2012/0185065 | A1* | 7/2012 | Fujii | G05B 19/409 700/83 |
| 2012/0303144 | A1* | 11/2012 | Grossmann | G05B 19/0426 700/90 |
| 2016/0291563 | A1* | 10/2016 | Kumar | H04L 67/125 |

(Continued)

FOREIGN PATENT DOCUMENTS

| | | |
|---|---|---|
| CN | 101634833 A | 1/2010 |
| CN | 105404186 A | 3/2016 |

(Continued)

OTHER PUBLICATIONS

Padim, "Process Automation Device Information Model", Feb. 2019 (Year: 2019).*

(Continued)

*Primary Examiner* — Messeret F Gebre

(74) *Attorney, Agent, or Firm* — Leydig, Voit & Mayer, Ltd.

(57) ABSTRACT

A field device configuration tool includes: a user interface; a processing unit; and a memory. The processing unit controls the user interface to present information for a parameter of a field device on a display of the user interface. The user interface enables a user of the field device to input a semantic identification ID for the parameter of the field device. The processing unit maps the semantic identification ID to the parameter for the field device as a mapping. The processing unit saves the mapping between the semantic ID and the parameter in the memory as a saved mapping.

6 Claims, 1 Drawing Sheet

(56) References Cited

U.S. PATENT DOCUMENTS

| | | | | |
|---|---|---|---|---|
| 2021/0136035 A1* | 5/2021 | Bacus | ............... | H04L 41/0686 |
| 2021/0182281 A1* | 6/2021 | Diancin | ............... | G06F 16/248 |
| 2021/0240157 A1* | 8/2021 | Bornkessel | ........ | G05B 19/4185 |

FOREIGN PATENT DOCUMENTS

| | | | | | |
|---|---|---|---|---|---|
| CN | 105607596 A | | 5/2016 | | |
| CN | 105830417 A | | 8/2016 | | |
| EP | 2608026 A1 | * | 6/2013 | ............... | G06F 8/38 |
| EP | 3654123 A1 | | 5/2020 | | |

OTHER PUBLICATIONS

R. Simon, C. Diedrich, M. Riedl and M. Thron, "Field device integration," ISIE 2001. 2001 IEEE International Symposium on Industrial Electronics Proceedings (Cat. No.01TH8570), Pusan, Korea (South), 2001, pp. 150-155 (Year: 2001).*

Mori, H., Machida, A., Ozaki, M., & Sukegawa, H. (2001). PRM field device management package. Yokogawa Technical Report (English Edition), (32), 20-3. (Year: 2001).*

S. Hodek and J. Schlick, "Ad hoc field device integration using device profiles, concepts for automated configuration and web service technologies: Plug&Play field device integration concepts for industrial production processes," International Multi-Conference on Systems, Chemnitz, Germany, 2012 (Year: 2012).*

The Patent Office of the People's Republic of China, Office Action in Chinese Patent Application No. 202110678560.2, 14 pp. (Jul. 31, 2023).

* cited by examiner

FIELD DEVICE CONFIGURATION TOOL

CROSS-REFERENCE TO PRIOR APPLICATION

Priority is claimed to European Patent Application No. EP 20 181 837.4, filed on Jun. 24, 2020, the entire disclosure of which is hereby incorporated by reference herein.

FIELD

The present invention relates to a field device configuration tool, a method of providing field device information one or more computer programs, a non-transitory computer storage medium, a download product, one or more computers with the one or more computer programs, one or more computers with the non-transitory computer storage medium, and one or more computers with the download product.

BACKGROUND

Industrial plants are fitted with numerous field devices, with communication protocols such as Highway Addressable Remote Transducer (HART) protocol, Fieldbus Foundation, Profibus or ProfiNet and can be configured based on Electronic Device Descriptions (EDDs) or Field Device Integration (FDI) packages.

Field devices can have provided Open Platform Communications Unified Architecture (OPC UA) servers with parameters usable to configure the field devices, e.g. on Edge devices and indeed some field devices can have embedded OPC UA servers.

However, end users can find it problematic to configure field devices.

There is a need to address this issue.

SUMMARY

In an embodiment, the present invention provides a field device configuration tool, comprising: a user interface; a processing unit; and a memory, wherein the processing unit is configured to control the user interface to present information for a parameter of a field device on a display of the user interface, wherein the user interface is configured to enable a user of the field device to input a semantic identification ID for the parameter of the field device, wherein the processing unit is configured to map the semantic identification ID to the parameter for the field device as a mapping, and wherein the processing unit is configured to save the mapping between the semantic ID and the parameter in the memory as a saved mapping.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
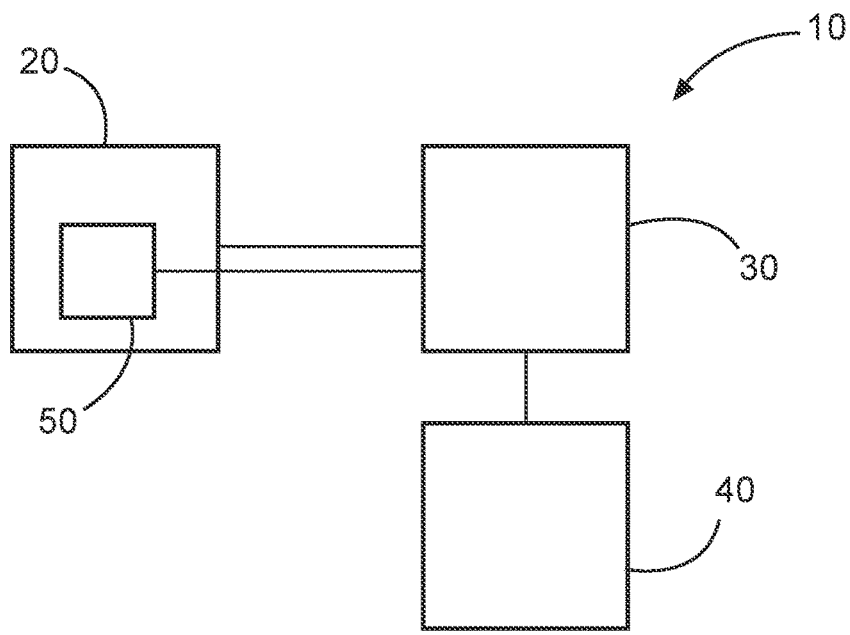
FIG. 1 shows a schematic representation of a filed device configuration tool.

In an embodiment, the present invention provides an improved technique to help in the configuration of field devices.

In a first aspect, there is provided a field device configuration tool, comprising:
  a user interface;
  a processing unit; and
  a memory.

The processing unit is configured to control the user interface to present information for a parameter of a field device on a display of the user interface. The user interface is configured to enable a user of the field device to input a semantic identification "ID" for the parameter of the field device. The processing unit is configured to map the semantic ID to the parameter for the field device. The processing unit is configured to save the mapping between the semantic ID and the parameter in the memory.

In an example, the configuration tool comprises an output unit. The output unit is configured to output the parameter based on the semantic ID for the parameter.

In an example, the information for the parameter is in a human understandable format.

In an example, the processing unit is configured to generate the information for the parameter. The generation can comprise utilization of an Electronic Device Description "EDD" for the field device.

In an example, the processing unit is configured to generate the information for the parameter. The generation can comprise utilization of OPCUA nodes of field devices with embedded OPCUA servers.

In an example, the memory is configured to maintain the saved mapping between the semantic ID and the parameter upon power down and power back up of the configuration tool.

In a second aspect, there is provided a method of providing field device information, the method comprising:
  b) controlling with a processing unit of a configuration tool a user interface of the configuration tool to present information for a parameter of a field device on a display of the user interface;
  c) inputting by a user of field device via the user interface a semantic identification "ID" for the parameter of the field device;
  d) mapping by the processing unit the semantic ID to the parameter for the field device; and
  e) saving by the processing unit the mapping between the semantic ID and the parameter in a memory of the configuration tool.

In an example, the method comprises step g) outputting by an output unit of the configuration tool the parameter based on the semantic ID for the parameter.

In an example, the information for the parameter is in a human understandable format.

In an example, the method comprises step a1) generating by the processing unit the information for the parameter, wherein the generating comprises utilizing an Electronic Device Description "EDD" for the field device.

In an example, the method comprises step a2) generating by the processing unit the information for the parameter, wherein the generating comprises utilizing OPCUA nodes of field devices with embedded OPCUA servers.

In an example, the method comprises step f) maintaining the saved mapping between the semantic ID and the parameter upon power down and power back up of the configuration tool.

One or more computer programs, comprising machine-readable instructions that, when executed on one or more computers, cause the one or more computers to perform the method described herein.

A non-transitory computer storage medium, and/or a download product, with the one or more computer programs described herein.

One or more computers with the one or more computer programs as described herein, and/or with the non-transitory computer storage medium and/or the download product described herein.

In a third aspect, there is provided one or more computer programs, comprising machine-readable instructions that, when executed on one or more computers, cause the one or more computers to perform the method according to the second aspect.

In a fourth aspect, there is provided a non-transitory computer storage medium, and/or a download product, with the one or more computer programs according to the third aspect.

In a fifth aspect, there is provided one or more computers with the one or more computer programs according to the third aspect.

In a sixth aspect, there is provided one or more computers with the non-transitory computer storage medium and/or the download product according to the fourth aspect.

The above aspects and examples will become apparent from and be elucidated with reference to the embodiments described hereinafter.

FIG. 1 relates to a field device configuration tool 10.

The field device configuration tool comprises a user interface 20, a processing unit 30, and a memory 40. The processing unit is configured to control the user interface to present information for a parameter of a field device on a display of the user interface. The user interface is configured to enable a user of the field device to input a semantic identification "ID" for the parameter of the field device. The processing unit is configured to map the semantic ID to the parameter for the field device. The processing unit is configured to save the mapping between the semantic ID and the parameter in the memory.

According to an example, the configuration tool comprises an output unit 50, that can for example be part of the user interface. The output unit is configured to output the parameter based on the semantic ID for the parameter. Thus, an input unit that could be the user interface or another input unit, can receive a semantic ID and from the mapping information saved in the memory, the parameter can be output.

According to an example, the information for the parameter is in a human understandable format.

According to an example, the processing unit is configured to generate the information for the parameter. The generation can comprise utilization of an Electronic Device Description "EDD" for the field device.

According to an example, the processing unit is configured to generate the information for the parameter. The generation can comprise utilization of OPCUA nodes of field devices with embedded OPCUA servers.

According to an example, the memory is configured to maintain the saved mapping between the semantic ID and the parameter upon power down and power back up of the configuration tool.

Figure 2:
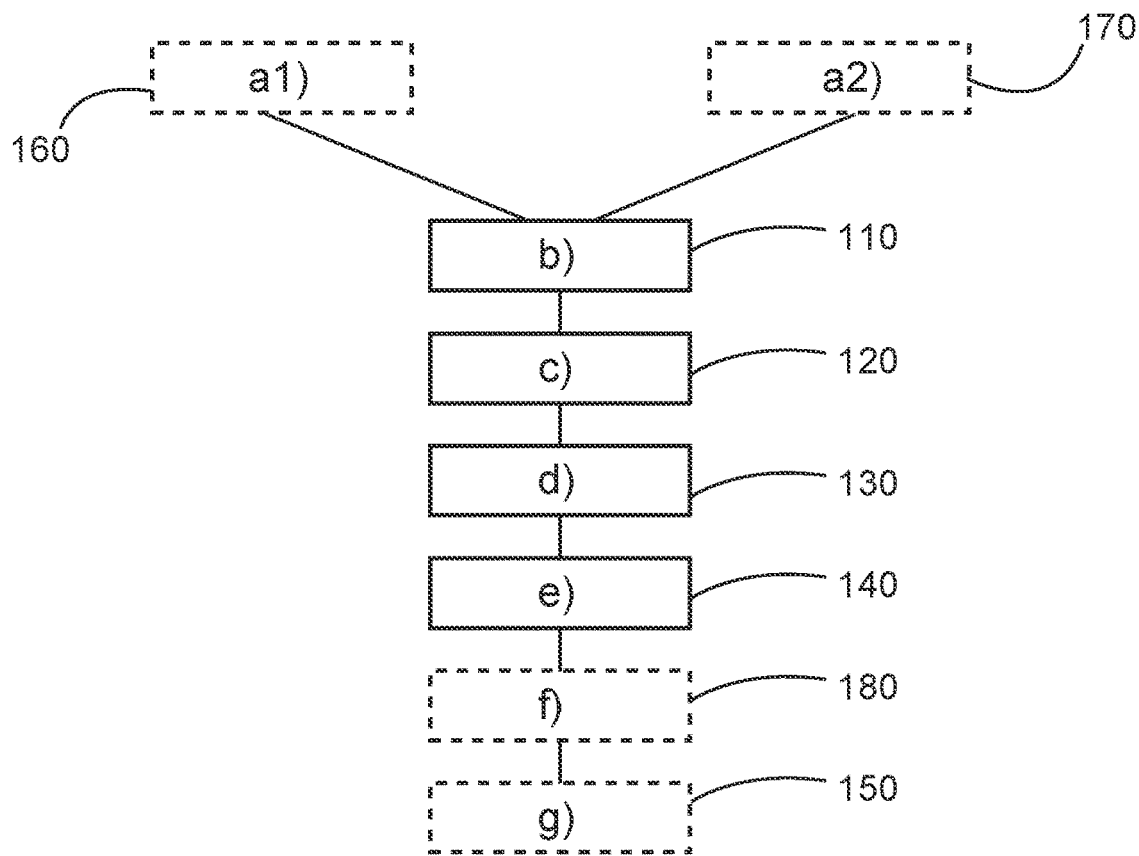
FIG. 2 shows a method of providing field device information.

FIG. 2 shows a method 100 of providing field device information in its basic steps. Essential steps are shown in bold lines and optional step are shown in dashed steps.

The method comprises:
in a controlling step 110, also referred to as step b), controlling with a processing unit of a configuration tool a user interface of the configuration tool to present information for a parameter of a field device on a display of the user interface;
in an inputting step 120, also referred to as step c), inputting by a user of field device via the user interface a semantic identification "ID" for the parameter of the field device;
in a mapping step 130, also referred to as step d) mapping by the processing unit the semantic ID to the parameter for the field device; and
in a saving step 140, also referred to as step e), saving by the processing unit the mapping between the semantic ID and the parameter in a memory of the configuration tool.

According to an example, the method comprises step g) outputting 150 by an output unit of the configuration tool the parameter based on the semantic ID for the parameter.

According to an example, the information for the parameter is in a human understandable format.

According to an example, the method comprises step a1) generating 160 by the processing unit the information for the parameter, wherein the generating comprises utilizing an Electronic Device Description "EDD" for the field device.

According to an example, the method comprises step a2) generating 170 by the processing unit the information for the parameter, wherein the generating comprises utilizing OPCUA nodes of field devices with embedded OPCUA servers.

According to an example, the method comprises step f) maintaining 180 the saved mapping between the semantic ID and the parameter upon power down and power back up of the configuration tool.

From the above, it is clear that one or more computer programs, comprising machine-readable instructions that, can be provided which when executed on one or more computers, cause the one or more computers to perform the method 100.

Also, from the above it is clear that a non-transitory computer storage medium, and/or a download product, can comprises the one or more computer programs.

One or more computers can then operate with the one or more computer programs.

One or more computers can then comprise the non-transitory computer storage medium and/or the download product.

Thus, configuration tools may provide data of the field devices via an OPCUA server, whether embedded or not. In order to have a unique namespace for identical parameters of different device types, a parameter will be tagged with a semantic ID. This is a development of for example that coming from the definition of PADIM. Using semantic IDs, an OPCUA client can access device information in a generic way for different types of field devices.

The semantic IDs can be assigned to parameters, which can in most cases only be done by the device manufactures, because experts know the names of parameter within the EDD and the meaning of them. In order to define semantic IDs, detailed know how of the field device is needed. In order to define the semantic ID of a parameter the information can be added to the corresponding EDD or an additional file can be provided which defines the mapping between the parameter within the EDD and the semantic ID.

Also, semantic IDs do not exist for all device types and parameters and it has not been able up until now for these to be assigned later by the end user.

The new development described here provides a process for tagging field device parameter with semantic Ids by the end users.

This is achieved in summary in the following manner. The user interface of a device configuration tool allows an end user to assign a semantic ID for a device parameter shown in the user interface. The corresponding parameter within the device model (defined in an EDD/Device package) is then determined by the device configuration tool and the semantic ID then assigned to the right parameter. Once assigned the tool can provide the appropriate parameter values based on their semantic ID.

Thus, the tagging of parameters with semantic Ids can now be done by end users because detailed know how of the field device and the corresponding EDD/Device Package is not now needed.

Therefore, parameters of a field device need not be tagged with semantic IDs by the device manufacturer, but can be done by the end user. Missing semantic IDs that would have led to a situation that applications using semantic IDs cannot use all devices of a plant has also been mitigated.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A field device configuration tool, comprising:
    a user interface;
    a processing unit;
    a memory; and
    an output unit,
    wherein the processing unit is configured to generate information for each parameter of a plurality of parameters of a field device as a generation, the field device comprising at least one OPCUA node with at least one embedded OPCUA server, the generation comprises utilization of at least one of an Electronic Device Description (EDD) for the field device and the at least one OPCUA node of the field device,
    wherein the processing unit is configured to control the user interface to present information for the plurality of parameters of the field device on a display of the user interface, the information for the plurality of parameters being in a human understandable format,
    wherein the user interface is configured to enable a user of the field device to input one semantic identification (ID) for each parameter of the plurality of parameters of the field device with respect to the information for the parameter of the field device presented on the display of the user interface,
    wherein the processing unit is configured to map each semantic ID to each corresponding parameter for the field device as a mapping,
    wherein the processing unit is configured to save the mapping between each semantic ID and each corresponding parameter in the memory as a saved mapping, and
    wherein the output unit is configured to output parameter values based on the semantic ID for the corresponding parameter.

2. The field device configuration tool of claim 1, wherein the memory is configured to maintain the saved mapping between each semantic ID and the corresponding parameter upon power down and power back up of the field device configuration tool.

3. A method of providing field device information, comprising:
    a) generating, by a processing unit of a configuration tool, information for each parameter of a plurality of parameters of a field device, the field device comprising at least one OPCUA node with at least one embedded OPCUA server, the generating comprising utilizing at least one of an Electronic Device Description (EDD) for the field device and the at least one OPCUA node of the field device;
    b) controlling, with the processing unit of the configuration tool, a user interface of the configuration tool to present information for each parameter of the plurality of parameters of the field device on a display of the user interface, the information for the plurality of parameters being in a human understandable format;
    c) inputting, by a user of the field device via the user interface, one semantic identification (ID) for a corresponding parameter of the plurality of parameters of the field device with respect to the information for the corresponding parameter of the field device presented on the display of the user interface;
    d) mapping, by the processing unit, each semantic ID to each corresponding parameter for the field device as a mapping;
    e) saving, by the processing unit, the mapping between each semantic ID and each corresponding parameter in a memory of the configuration tool as a saved mapping; and
    g) outputting, by an output unit of the configuration tool, each parameter based on the semantic ID for the parameter.

4. The method of claim 3, further comprising:
    f) maintaining the saved mapping between each semantic ID and the corresponding parameter upon power down and power back up of the configuration tool.

5. One or more non-transitory computer-readable mediums having processor-executable instructions stored thereon, wherein the processor-executable instructions, when executed, facilitate the method of claim 3.

6. A computer with the one or more non-transitory computer-readable mediums of claim 5.

* * * * *